United States Patent [19]

Ebert et al.

[11] Patent Number: 5,525,674

[45] Date of Patent: Jun. 11, 1996

[54] POLYCARBONATES WITH ALIPHATIC KETOCARBOXYL END GROUPS, MIXED WITH KNOWN AROMATIC POLYCARBONATES, THEIR PREPARATION AND THEIR USE

[75] Inventors: Wolfgang Ebert; Burkhard Köhler, both of Krefeld; Klaus Horn, Dormagen; Richard Weider, Leverkusen; Thomas Scholl, Bergisch Gladbach; Rolf Dhein, Krefeld; Jürgen Kirsch, Leverkusen; Rolf Wehrmann, Krefeld, all of Germany

[73] Assignee: Bayer AG, Leverkusen

[21] Appl. No.: 396,763

[22] Filed: Mar. 1, 1995

[30]      Foreign Application Priority Data

Mar. 11, 1994 [DE] Germany .......................... 44 08 214.2
Jul. 11, 1994 [DE] Germany .......................... 44 24 399.5

[51] Int. Cl.⁶ ..................... C08G 64/18; C08G 64/14
[52] U.S. Cl. ..................... 525/146; 525/90; 525/92 E; 525/148; 528/128; 528/196
[58] Field of Search ..................... 525/90, 92 E, 525/146, 148; 528/128, 196

[56]      References Cited

U.S. PATENT DOCUMENTS 3,790,549  2/1974  Feniak .
4,358,563  11/1982 Quinn et al. ...................... 525/146
4,806,599  2/1989  Priddy ............................... 525/146
5,023,299  6/1991  Meuer ............................... 525/146

FOREIGN PATENT DOCUMENTS 248261   12/1987  European Pat. Off. .
258689   3/1988   European Pat. Off. .
305718   3/1989   European Pat. Off. .
412407   2/1995   European Pat. Off. .
3618378  12/1987  Germany .
3941563  6/1991   Germany .

*Primary Examiner*—David Buttner
*Attorney, Agent, or Firm*—Connolly & Hutz

[57]      ABSTRACT

The present invention provides polycarbonates with aliphatic ketocarboxyl end groups, optionally mixed with known aromatic polycarbonates, and a process for their preparation, the chain terminators used being those of formula (I):

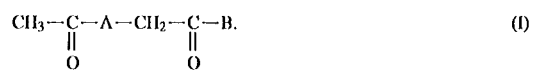

The present invention also provides mixtures of the polycarbonates or polycarbonate mixtures with reactionless polyisobutylenes.

2 Claims, No Drawings

POLYCARBONATES WITH ALIPHATIC KETOCARBOXYL END GROUPS, MIXED WITH KNOWN AROMATIC POLYCARBONATES, THEIR PREPARATION AND THEIR USE

The present invention provides a process for the preparation of aromatic polycarbonates with aliphatic ketocarboxyl end groups and with average molecular weights Mw (weight-average, determined by light scattering) of between 8000 and 150,000, mixed with known aromatic polycarbonates with Mw (weight-average, determined by light scattering) of between 8000 and 50,000, consisting of diphenols, 1 mol % to 20 mol %, based on moles of diphenols, of a chain terminator, phosgene and optionally branching agents, by the known polycarbonate preparation methods of the interfacial process or the homogeneous solution process, characterized in that chain terminators of formula (I):

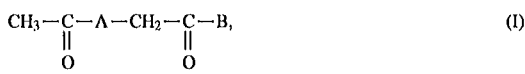

are used, in combination with other, known chain terminators, wherein between 0.5 mol % and 50 mol % chain terminators of formula (I), referred to the total molar sum of chain terminators, are used.

In the chain terminators of formula (I), —A— is a polymeric aliphatic radical prepared by the polymerization of unsaturated compounds, and B is a functional group acting as the reactive part of the chain terminators (I) in polycarbonate preparation by the two-phase interfacial or by the homogeneous phase process (pyridine process). Preferred groups B are —OH or —Cl.

The molecular weight Mn (number-average molecular weight, determined by gel permeation chromatography) of the chain terminators of formula (I) is between 250 and 30,000, preferably between 1000 and 10,000.

Preferred compounds of formula (I) where B=OH are obtained for example by the oxidation of isobutylene/isoprene copolymers according to DE-OS 21 47 874.

Isobutylene/isoprene copolymers are in turn obtainable by the copolymerization of isobutylene and 0.3 mol % to 25 mol %, based on 1 mol of isobutylene monomer, of isoprene and are commercially available under the name of, for example, butyl rubber. The diene here is linked essentially in the 1,4 -position; small proportions of diene linked in the 1,2 -position, which are present in all commercially available butyl rubbers and cannot be completely suppressed, result in similarly small proportions of lateral carboxyl groups.

The oxidation of these isobutylene/isoprene copolymers according to DE-OS 21 47 874 is carried out for example by means of ozone at slightly elevated temperature or at room temperature.

The compounds of formula (I) where B=OH can be used in known manner to obtain the acid chlorides, where B=Cl, by chlorination with thionyl or sulphonyl chloride or phosgene in conventional manner.

Examples of chain terminators of formula (I) to be used according to the invention are the following ozonization products of polyisobutylene/isoprene rubbers with 0.3–25 mol % of copolymerized isoprene, which are characterized as follows:

PIB-carboxylic acid I:
  Acid number: 15 mg KOH/g, molecular weight calculated therefrom: 3733 g/mol
  Iodine number: >1
  OH number: >2
PIB-carboxylic acid II:
  Acid number: 190 mg KOH/g, molecular weight calculated therefrom: 295 g/mol
  Iodine number: >1
  OH number: >2
PIB-carboxylic acid III:
  Acid number: 32 mg KOH/g, molecular weight calculated therefrom: 1750 g/mol
  Iodine number: 2
  OH number: >2
PIB-carboxylic acid IV:
  Acid number: 6 mg KOH/g, molecular weight calculated therefrom: 9333 g/mol
  Iodine number: >1
  OH number: >2

Examples of other, known chain terminators to be used concomitantly in the process according to the invention are phenols, carboxylic acid halides, sulphonic acid chlorides or chlorocarbonic acid esters.

Examples of the known chain terminators to be used concomitantly are phenol, p-tert-butylphenol, 2,6-dimethylphenol, p-isooctylphenol, acetyl chloride and benzoyl chloride, or mixtures of the different chain terminators.

The present invention also provides the aromatic polycarbonates obtainable by the process according to the invention, with end groups of formula (Ia):

wherein A is as defined for formula (I), and with Mw (weight-average, determined by light scattering) of between 8000 and 150,000, mixed with known aromatic polycarbonates with Mw (weight-average, determined by light scattering) of between and 150,000, which result from the chain cleavage with the other, known chain terminators.

Aromatic polycarbonates obtainable according to the invention, with average molecular weights Mw (weight-average, determined by light scattering) of between 8000 and 150,000, are preferably those of formula (II):

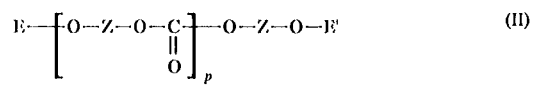

wherein

—O—Z—O— is a diphenate radical preferably having 6 to 30 C atoms,

E and E' are identical or different, radicals of chain terminators, wherein between 0.5 mol % and 50 mol % of the molar sum of E+E' are corresponding to a radical of formula (Ia):

wherein —A— is as defined for formula (I), and the remaining end groups E and E' resulting from the reaction with the other, known chain terminators, optionally with the incorporation of phosgene, and p is the degree of polymerization which results from the molecular weights Mw of 8000 to 150,000 and which is between 5 and 600.

The polycarbonates and polycarbonate mixtures according to the invention have a very good resistance to chemicals.

DE-OS 26 20 256 (Le A 16 686) has disclosed polycarbonates having aliphatic carboxyl radicals as end groups. They are distinguished by an improved mould release property.

DE-OS 26 36 783 (Le A 16 689) has disclosed polycarbonates incorporating carboxyl group-containing segments with Mn greater than 600. The COOH-containing segments can also be monofunctional (page 5 of the DE-OS, third line from the bottom).

DE-OS 27 02 626 (Le A 17 356) has also disclosed polycarbonates incorporating carboxyl group-containing segments with Mn greater than 600, especially of between 1000 and 20,000. The segments can also be monofunctional (page 6 of the DE-OS, paragraph 1).

DE-OS 27 16 304 (Le A 18 024) has disclosed polycarbonate mixtures in which the polycarbonates can also contain aliphatic carboxyl radicals. The polycarbonate mixtures again have an improved mould release property.

DE-OS 36 18 378 (Le A 24 330) has disclosed poly($C_2$–$C_{10}$-α-olefin)carboxylic acids with Mw of 2000 to 350,000 which have a COOH functionality of 0.5 to 2.0 per molecule (page 5 of the DE-OS, lines 7 to 13). These carboxylic acids are used for the preparation of polyolefin/ polycarbonate block copolymers (page 3 of the DE-OS, lines 7 to 10). These polyolefin/polycarbonate block copolymers are used in industry, for example as coupling agents, compatibility improvers or dispersants in incompatible thermoplastic polymer mixtures. By contrast, the polycarbonates and polycarbonate mixtures according to the invention have the following advantage: The low non-uniformity of the end groups according to the invention is such that a substantially more homogeneous polycarbonate or polycarbonate mixture is obtained.

Diphenols of formula (III):

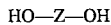

HO—Z—OH     (III)

preferably having 6 to 30 C atoms, which are suitable for the preparation of the polycarbonates according to the invention, are both mononuclear and polynuclear diphenols which can contain heteroatoms and can have substituents which are inert under the conditions of preparation and thermal treatment of the polycarbonates.

Examples which may be mentioned are hydroquinone, resorcinol, dihydroxybiphenyl, bis(hydroxyphenyl)alkanes, bis(hydroxyphenyl)cycloalkanes, bis(hydroxyphenyl)sulphides, ethers, ketones, sulphoxides and sulphones, and α,α-bis(hydroxyphenyl)diisopropylbenzenes and ring-alkylated and ring-halogenated compounds thereof.

Examples of suitable diphenols are described in U.S. Pat. Nos. 3,028,365, 2,999,835, 3,062,781, 3,148,172 and 4,982,014, in German Offenlegungsschriften 1 570 703 and 2 063 050 and in the monograph "H. Schnell, Chemistry and Physics of Polycarbonates, Interscience Publishers, New York, 1964".

Preferred diphenols are 4,4'-dihydroxybiphenyl, 2,2-bis(4-hydroxyphenyl)propane, 2,4-bis(4-hydroxyphenyl)-2-methylbutane, 1,1-bis(4-hydroxyphenyl)cyclohexane, α,α-bis(4-hydroxyphenyl)-p-diisopropylbenzene, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,1-bis(3,5-dimethyl-4-hydroxyphenyl)cyclohexane, α,α'-bis(3,5-dimethyl-4-hydroxyphenyl)-p-diisopropylbenzene, 1,1-bis(4-hydroxyphenyl)-3,3,5-trimethylcyclohexane, 1,1-bis(4-hydroxyphenyl)-3-methylcyclohexane, 1,1-bis(4-hydroxyphenyl)-3,3-dimethylcyclohexane, 1,1-bis(4-hydroxyphenyl)-4-methylcyclohexane, 2,2-bis(3,5-dichloro-4-hydroxyphenyl)propane 2,2-bis(3,5-dibromo-4-hydroxyphenyl)propane and 1,1-bis(4-hydroxyphenyl)-1-phenyl ethane.

Particularly preferred diphenols are e.g.: 2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane, 1,1-bis(4-hydroxyphenyl)-1-phenyl ethane.

1,1-bis(4-hydroxyphenyl)-3,3,5-trimethylcyclohexane, 1,1-bis(4-hydroxyphenyl)-3-methylcyclohexane and 1,1-bis(3,5-dimethyl-4-hydroxyphenyl)-4-methylcyclohexane.

2,2-Bis(4-hydroxyphenyl)propane and 1,1-bis(4-hydroxyphenyl)-3,3,5-trimethylcyclohexane are very particularly preferred.

It is also possible to use any desired mixtures of the abovementioned diphenols.

To improve the flow behaviour, it is also possible concomitantly to use, in known manner, small amounts, preferably amounts of between 0.05 and 2.0 mol % (based on moles of starting diphenols), of compounds with a functionality of three or more, especially those with three or more phenolic hydroxyl groups. Examples of some of the usable compounds with three or more phenolic hydroxyl groups are 1,3,5-tri(4-hydroxyphenyl)benzene, 1,1,1-tri(4-hydroxyphenyl)ethane, 2,6-bis(2-hydroxy-5'-methylbenzyl)-4-methylphenol, 2-(4-hydroxyphenyl)-2-(2,4-dihydroxyphenyl)propane, hexa(4-(4-hydroxyphenylisopropyl)phenyl)orthoterephthalate, tetra(4-hydroxyphenyl)methane and 1,4-bis(4',4''-dihydroxytriphenylmethyl)benzene. Some of the other trifunctional compounds are 2,4-dihydroxybenzoic acid, trimesic acid, cyanuric chloride and 3,3-bis(4-hydroxy-3-methylphenyl)-2-oxo-2,3-dihydroindole.

The polycarbonates and polycarbonate mixtures according to the invention can be prepared essentially by the following two known methods (cf. H. Schnell, "Chemistry and Physics of Polycarbonates", Polymer Review, vol. IX, page 27 et seq., Interscience Publ. 1964):

1. By the solution process in the disperse phase (so-called two-phase interfacial process):

Here the starting diphenols are dissolved in an aqueous alkaline phase. The chain terminators required for the preparation of the polycarbonates according to the invention, either as such or dissolved in an organic solvent, are added in amounts of 1.0 to 20.0 mol %, based on moles of diphenol. The mixture is then reacted with phosgene in the presence of an inert organic phase in which the polycarbonates are preferably soluble. The reaction temperature is between 0° C. and 40° C.

The addition of the required chain terminators, in the manner and amount indicated above, can also take place during or after the phosgenation. Examples of suitable organic solvents for the chain terminators are methylene chloride, chlorobenzene, mixtures of methylene chloride and chlorobenzene, acetone, acetonitrile and toluene.

The reaction can be promoted by means of catalysts such as tributylamine or triethylamine. To promote the incorporation of the chain terminator, it is also possible concomitantly to use onium salts, such as tetraalkylammonium halides for instance, as phase transfer catalysts.

If branching agents are used concomitantly, they can be added before the reaction with phosgene or during the phosgenation.

It is also possible to use the chlorocarbonic acid esters of the diphenols in addition to or instead of the diphenols themselves.

2. By the solution process in the homogeneous phase (also called the pyridine process):

Here the diphenols are dissolved in organic bases such as pyridine, optionally with the addition of other organic solvents; the chain terminators required for the preparation of the polycarbonates according to the invention are then added, as described under 1., in amounts of 1.0 to 20.0 mol %, based on moles of diphenol, at room temperature.

The mixture is then reacted with phosgene. The reaction temperature is between 0° C. and 40° C. Examples of suitable organic bases other than pyridine are triethylamine and tributylamine; examples of suitable solvents are methylene chloride, chlorobenzene, toluene or mixtures of methylene chloride and chlorobenzene or toluene. The isolation of the polycarbonates according to the invention in process variants 1 and 2 is effected in known manner. Particularly suitable working-up procedures are precipitation, spray drying and evaporation of the solvent under vacuum.

If branching agents are used concomitantly, the procedure is as described under 1.

In addition to the diphenols, it is also possible to use up to 50 mol %, based on the starting diphenols, of their bischlorocarbonic acid esters.

The additives conventionally used for thermoplastic polycarbonates, such as stabilizers, mould release agents, pigments, flameproofing agents, antistatic agents, fillers and reinforcing materials, can be added in the conventional amounts to the polycarbonates according to the invention, either before or after they have been processed. The polycarbonates according to the invention can be processed to moulded articles, for example by isolating the polycarbonates in known manner, extruding them to form granules and processing these granules to various articles by injection moulding in known manner, optionally after the addition of the abovementioned additives. The polycarbonates according to the invention can be used as moulded articles wherever the polycarbonates known hitherto have been used, i.e. for example in the electrical sector and in the building sector, and specifically when an increased resistance to chemicals is demanded.

Examples of uses are sheets, composite sheets, extrusion and injection mouldings with and without fillers or glass fibre reinforcement, such as e.g. safety helmets, foams, panelling and blow mouldings, and medical articles such as tubing and short-term implants.

Other thermoplastics can also be mixed in conventional amounts with the polycarbonates obtainable by the process according to the invention.

Examples of other thermoplastics which are suitable are aromatic polyester-carbonates and polyalkylene terephthalates.

It is thus possible additionally to modify the properties of the polycarbonates according to the invention.

In particular, reactionless polyisobutylenes can also be added for further modification of the polycarbonates according to the invention or polycarbonate mixtures according to the invention.

Thus the present invention also provides mixtures of

A) 80–99% by weight, preferably 85–97% by weight, of the polycarbonates or polycarbonate mixtures obtainable according to the invention, and B) 1–20% by weight, preferably 3–15% by weight, of reactionless polyisobutylenes.

Polyisobutylenes according to component B) of the present invention are cationic polymers of olefins and optionally dienes containing at least 85% of isobutylene. Polyisobutylenes are described under the key word "Polyisobutylene" ("Polyisobutylenes") on page 3539, volume 5, in Römpp Chemie Lexikon, 9th edition, 1992, Georg Thieme Verlag. The molar mass of the polyisobutylenes to be used according to the invention is 1000 to 5,000,000, preferably 10,000 to 1,200,000 g/mol. This is determined by light scattering.

Examples of dienes suitable as comonomers for isobutylene are butadiene, isoprene, 2-chlorobuta-1,4-diene, 2-bromobuta-1,3-diene, pentadiene, hexadiene, 2-ethylbuta-1,3-diene, 2 -propylbuta-1,3-diene, 2-phenylbuta-1,3-diene, 2-methylpenta-1,3-diene or 3-propylenehexadiene. Other suitable olefinic comonomers are styrene, α-methylstyrene, m/p-methylstyrene or divinylbenzene.

These mixtures are prepared via the melt at temperatures of 220° C. to 380° C.

The isolation of these mixtures according to the invention, the processing of these mixtures according to the invention and the industrial applicability of these mixtures are governed by the remarks made above for the polycarbonates or polycarbonate mixtures obtainable according to the invention.

EXAMPLES

General:

The ketocarboxylic acids used were ozonization products of polyisobutylene/isoprene rubbers which were characterized as follows:

PIB-carboxylic acid I:
  Acid number: 15 mg KOH/g, molecular weight calculated therefrom: 3733 g/mol
  Iodine number: >1
  OH number: >2

PIB-carboxylic acid II:
  Acid number: 190 mg KOH/g, molecular weight calculated therefrom: 295 g/mol
  Iodine number: >1
  OH number: >2

PIB-carboxylic acid III:
  Acid number: 32 mg KOH/g, molecular weight calculated therefrom: 1750 g/mol
  Iodine number: 2
  OH number: >2

PIB-carboxylic acid IV:
  Acid number: 6 mg KOH/g, molecular weight calculated therefrom: 9333 g/mol
  Iodine number: >1
  OH number: >2

Example 1

Polycarbonate with 0.5% by weight of polyisobutylenecarboxylic acid I (M=3733) as part of the chain terminator In a 114-necked wave-breaking flask equipped with a stirrer, a gas inlet tube, a thermometer, a reflux condenser and optionally a dropping funnel and a pH electrode, 22.83 g (0.1 mol) of bisphenol A, 39.11 g (0.44 mol) of NaOH (45%) and 0.298 g of phenol are dissolved in 232 ml of distilled water at room temperature, nitrogen being introduced simultaneously. A solution of 0.13 g of PIB-carboxylic acid I in 135 ml of dichloromethane and 135 ml of chlorobenzene is added. 16 g (0.16 mol) of phosgene are introduced over 15 to 30 minutes 10 at temperatures of between 20° C. and 25° C., with stirring (800 rpm). 0.11 ml of N-ethylpiperidine is then added as a catalyst and the mixture is subsequently stirred for 45 minutes at room temperature. The reaction mixture is then acidified with dilute hydrochloric acid and the organic phase is separated off. The organic phase is then washed 5 to 10 times with ion-free water until acid residues and ionic constituents have been removed. The organic phase is then dried over anhydrous sodium sulphate and dried at 100° C. in a vacuum drying cabinet.

Yield: 25.2 g; $\eta_{rel}$=1.324

Example 2

Polycarbonate with 1.0% by weight of polyisobutylenecarboxylic acid I (M=3733) as part of the chain terminator As Example 1 except that 0.295 g of phenol and 0.26 g of PIB-carboxylic acid I are used.

Yield: 25.1 g; $\eta_{rel}$=1.312

Example 3

Polycarbonate with 2.0% by weight of polyisobutylenecarboxylic acid I (M=3733) as part of the chain terminator
As Example 1 except that 0.289 g of phenol and 0.52 g of PIB-carboxylic acid I are used.

Yield: 25.3 g; $\eta_{rel}$=1.331

Example 4

Polycarbonate with 3.0% by weight of polyisobutylenecarboxylic acid I (M=3733) as part of the chain terminator As Example 1 except that 0.282 g of phenol and 0.79 g of PIB-carboxylic acid I are used.

Yield: 25.0 g; $\eta_{rel}$=1.319

Example 5

Polycarbonate with 3.0% by weight of polyisobutylenecarboxylic acid I (M=3733) as part of the chain terminator As Example 1 except that 0.282 g of phenol and 0.79 g of PIB-carboxylic acid I are used and a pH of ca. 8–10 is maintained during the phosgenation. Then, before the catalyst is added, the pH is adjusted to 12 and this value is maintained during the postcondensation time. The pH was adjusted by adding ⅔ of the indicated sodium hydroxide solution via the dropping funnel as required.

Yield: 24.6 g; $\eta_{rel}$=1.267

Example 6

Polycarbonate with 4.0% by weight of polyisobutylenecarboxylic acid I (M=3733) as part of the chain terminator As Example 1 except that 0.278 g of phenol and 1.05 g of PIB-carboxylic acid I are used.

Yield: 25.6 g; $\eta_{rel}$=1.323

Example 7

Polycarbonate with 5.0% by weight of polyisobutylenecarboxylic acid I (M=3733) as part of the chain terminator As Example 1 except that 0.271 g of phenol and 1.32 g of PIB-carboxylic acid I are used.

Yield: 25.4 g; $\eta_{rel}$=1.328

Example 8

Polycarbonate with 7.5% by weight of polyisobutylenecarboxylic acid I (M=3733) as part of the chain terminator As Example 1 except that 0.256 g of phenol and 1.98 g of PIB-carboxylic acid I are used.

Yield: 26.8 g; $\eta_{rel}$=1.315

Example 9

Polycarbonate with 10.0% by weight of polyisobutylenecarboxylic acid I (M=3733) as part of the chain terminator As Example 1 except that 0.241 g of phenol and 2.63 g of PIB-carboxylic acid I are used.

Yield: 27.5 g; $\eta_{rel}$=1.313

Example 10

Polycarbonate with 20.0% by weight of polyisobutylenecarboxylic acid I (M=3733) as part of the chain terminator As Example 1 except that 0.181 g of phenol and 5.27 g of PIB-carboxylic acid I are used.

Yield: 29.6 g; $\eta_{rel}$=1.323

Example 11

Polycarbonate with 3.0% by weight of polyisobutylenecarboxylic acid II (M=295) as part of the chain terminator As Example 1 except that 0.047 g of phenol and 0.79 g of PIB-carboxylic acid II are used.

Yield: 24.32 g; $\eta_{rel}$=1.325

Example 12

Polycarbonate with 3.0% by weight of polyisobutylenecarboxylic acid II (M=295) as part of the chain terminator As Example 1 except that 0.047 g of phenol and 0.79 g of PIB-carboxylic acid II are used and a pH of ca. 8–10 is maintained during the phosgenation. Then, before the catalyst is added, the pH is adjusted to 12,and this value is maintained during the postcondensation time. The pH was adjusted by adding ⅔ of the indicated sodium hydroxide solution via the dropping funnel as required.

Yield: 24.7 g; $\eta_{rel}$=1.293

Example 13

Polycarbonate with 3.0% by weight of polyisobutylenecarboxylic acid II (M=295) as part of the chain terminator As Example 1 except that 0.047 g of phenol and 0.79 g of PIB-carboxylic acid II are used and only added shortly before the catalyst.

Yield: 24.9 g; $\eta_{rel}$=1.333

Example 14

Polycarbonate with 3.0% by weight of polyisobutylenecarboxylic acid III (M=1750) as part of the chain terminator As Example 1 except that 0.263 g of phenol and 0.79 g of PIB-carboxylic acid III are used and only added shortly before the catalyst.

Yield: 24.5 g; $\eta_{rel}$=1.339

Example 15

Polycarbonate with 3.0% by weight of polyisobutylenecarboxylic acid III (M=1750) as part of the chain terminator As Example 14 except that a pH of 8–10 is maintained during the phosgenation. Then, before the catalyst is added, the pH is adjusted to 12 and this value is maintained during the postcondensation time. The pH was adjusted by adding ⅔ of the indicated sodium hydroxide solution via the dropping funnel as required.

Yield: 24.7 g; $\eta_{rel}$=1.294

Example 16

Polycarbonate with 3.0% by weight of polyisobutylenecarboxylic acid IV (M=9333) as part of the chain terminator As Example 1 except that 0.292 g of phenol and 0.79 g of PIB-carboxylic acid IV are used.

Yield: 24.5 g; $\eta_{rel}$=1.331

Example 17

Polycarbonate with 3.0% by weight of polyisobutylene-carboxylic acid IV (M=9333) as part of the chain terminator As Example 16 except that a pH of 8–10 is maintained during the phosgenation. Then, before the catalyst is added, the pH is adjusted to 12 and this value is maintained during the postcondensation time. The pH was adjusted by adding ⅔ of the indicated sodium hydroxide solution via the dropping funnel as required.

Yield: 24.4 g; $\eta_{rel}$=1.303

We claim:

1. A process for the preparation of aromatic polycarbonates with aliphatic ketocarboxyl end groups and with average molecular weights Mw (weight-average, determined by light scattering) of between 8000 and 150,000 from diphenols, 1 mol % to 20 mol %, based on moles of diphenol, of a chain terminator, phosgene and optionally branching agents, by an interfacial or homogeneous solution preparation process, wherein between 0.5 mol % and 50 mol % of the total molar sum of chain terminator consists of chain terminators of formula (I)

which are obtained by the ozonization of isobutylene/isoprene rubbers and are optionally reacted to acid chlorides, and wherein —A— is a polymeric aliphatic radical with a molecular weight Mn (number-average molecular weight, determined by gel permeation chromatography) of 250 to 30,000 and wherein —B is —OH or —Cl, and wherein the balance of the chain terminators are selected from the group consisting of phenol, p-tert.-butylphenol, 2,6-dimethylphenol and p-isooctylphenol.

2. Aromatic polycarbonate produced by the process of claim 1.

* * * * *